US012673302B2

(12) United States Patent (10) Patent No.: US 12,673,302 B2

Matsumoto (45) Date of Patent: Jul. 7, 2026

(54) GAS SEPARATION MEMBRANE AND METHOD OF PRODUCING GAS SEPARATION MEMBRANE

(71) Applicant: SEIKO EPSON CORPORATION, Tokyo (JP)

(72) Inventor: Yasutaka Matsumoto, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 242 days.

(21) Appl. No.: 18/470,552

(22) Filed: Sep. 20, 2023

(65) Prior Publication Data

US 2024/0100491 A1 Mar. 28, 2024

(30) Foreign Application Priority Data

Sep. 22, 2022 (JP) ................................. 2022-150921

(51) Int. Cl.
  *B01D 71/70* (2006.01)
  *B01D 69/12* (2006.01)
(52) U.S. Cl.
  CPC ......... *B01D 71/70* (2013.01); *B01D 69/1214* (2022.08); *B01D 2323/36* (2013.01)
(58) Field of Classification Search
  CPC ........ B01D 69/12; B01D 71/70; B01D 69/00; B01D 69/02; B01D 69/1214; B01D 71/82
  See application file for complete search history.

(56) References Cited

U.S. PATENT DOCUMENTS

| | | | | |
|---|---|---|---|---|
| 2014/0208949 A1* | 7/2014 | Ishizuka | ............ | B01D 71/5211 |
| | | | | 427/535 |
| 2017/0182469 A1 | 6/2017 | Mochizuki et al. | | |
| 2018/0021738 A1 | 1/2018 | Fujikawa et al. | | |
| 2019/0291060 A1 | 9/2019 | Mochizuki et al. | | |

FOREIGN PATENT DOCUMENTS

| | | |
|---|---|---|
| JP | 2013075264 A | 4/2013 |
| JP | 2016163872 A | 9/2016 |
| JP | 2018015678 A | 2/2018 |
| WO | 2017038284 A1 | 3/2017 |
| WO | 2021146733 A1 | 7/2021 |

OTHER PUBLICATIONS

Office Action for CN Patent Application No. 202311208514.1, issued on Apr. 30, 2026, 20 pages.

* cited by examiner

*Primary Examiner* — Sharon Pregler

(74) *Attorney, Agent, or Firm* — CHIP LAW GROUP

(57) ABSTRACT

A gas separation membrane includes a resin layer including an organopolysiloxane and a modified layer provided at a surface on one side of the resin layer and including a functional group introduced into the surface on one side. When X-ray photoelectron spectrometry, in which X-rays are irradiated from the front surface side of the modified layer, is performed to generate an XPS spectrum in a range including an Si2p peak and the Si2p peak is subjected to waveform separation, the area ratio of the Si—O peak to the Si2p peak is from 2% to 30%.

5 Claims, 5 Drawing Sheets

GAS SEPARATION MEMBRANE AND METHOD OF PRODUCING GAS SEPARATION MEMBRANE

The present application is based on, and claims priority from JP Application Serial Number 2022-150921, filed Sep. 22, 2022, the disclosure of which is hereby incorporated by reference herein in its entirety.

BACKGROUND

1. Technical Field

The present disclosure relates to a gas separation membrane and a method of producing a gas separation membrane.

2. Related Art

Techniques that capture and directly recover carbon dioxide from the atmosphere are being studied towards the goal of carbon neutral. Known techniques of this kind include chemical absorption methods in which carbon dioxide is absorbed by an absorption liquid or an adsorption material, as well as membrane separation methods in which carbon dioxide is separated using a gas separation membrane.

For example, JP-A-2013-075264 discloses a gas separation composite membrane including a support layer and a gas separation layer, the support layer being made of a porous substance while the gas separation layer being stacked on the support layer. A hydrophilically modified surface modified to have hydrophilicity exists on the front surface of the gas separation layer. Further, JP-A-2013-075264 discloses that the hydrophilically modified surface is obtained by subjecting the gas separation layer to a treatment such as a plasma treatment and then to a silane coupling treatment. Such a gas separation composite membrane has both excellent gas separation properties and long service life.

However, an investigation by the present inventors found that gas permeability decreases when a hydrophilically modified surface is formed at the front surface of a gas separation layer by surface modification. For example, in JP-A-2013-075264, the plasma treatment is performed before the silane coupling treatment, and it has been found that such plasma treatment causes a decrease in gas permeability. When gas permeability decreases, a large amount of energy is required for gas separation.

The situation above presents the challenge of realizing a gas separation membrane with good gas permeability by optimizing the chemical bonding state of a polyorganosiloxane serving as a base of the gas separation membrane while achieving selective separation properties with respect to a target gas component by introducing a functional group.

SUMMARY

A gas separation membrane according to an application example of the present disclosure includes: a resin layer including an organopolysiloxane, and a modified layer provided at a surface on one side of the resin layer and including a functional group introduced into the surface on the one side, wherein an area ratio of an Si—O peak to an Si2p peak is from 2% to 30% when X-ray photoelectron spectrometry, in which X-rays are irradiated from a front surface side of the modified layer, is performed to generate an XPS spectrum in a range including the Si2p peak and the Si2p peak is subjected to waveform separation.

A method of producing a gas separation membrane according to an application example of the present disclosure includes: an activation treatment step of subjecting a surface on one side of a resin layer to an activation treatment, the resin layer including an organopolysiloxane, and a functional group-introducing step of bringing a coupling agent into contact with the surface on one side subjected to the activation treatment to introduce a functional group into the surface on the one side, the functional group-introducing step being provided after the activation treatment step, wherein an area ratio of an Si—O peak derived from $SiO_2$ to an Si2p peak is from 2% to 30% when X-ray photoelectron spectrometry is performed at the surface on the one side with the functional group introduced to generate an XPS spectrum including the Si2p peak and the Si2p peak is subjected to waveform separation.

DESCRIPTION OF EMBODIMENTS

A gas separation membrane and a method of producing a gas separation membrane according to an aspect of the present disclosure will be described in detail below with reference to an embodiment illustrated in the accompanying drawings.

1. Overview of Gas Separation Membrane

First, a configuration of the gas separation membrane according to an embodiment will be described.

Figure 1:
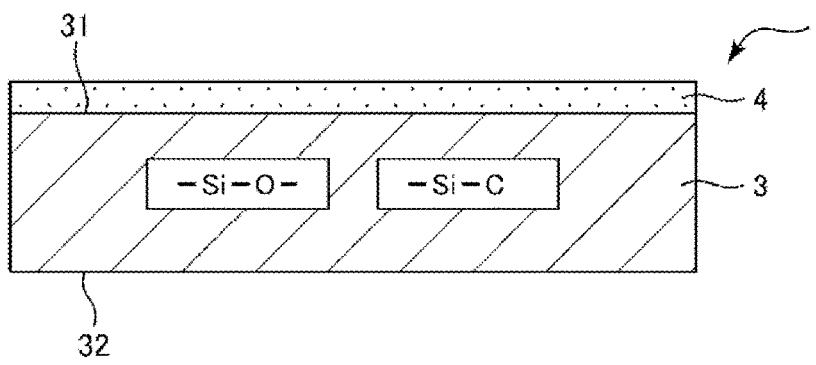
FIG. 1 is a cross-sectional view schematically illustrating a gas separation membrane according to an embodiment.
Figure 2:
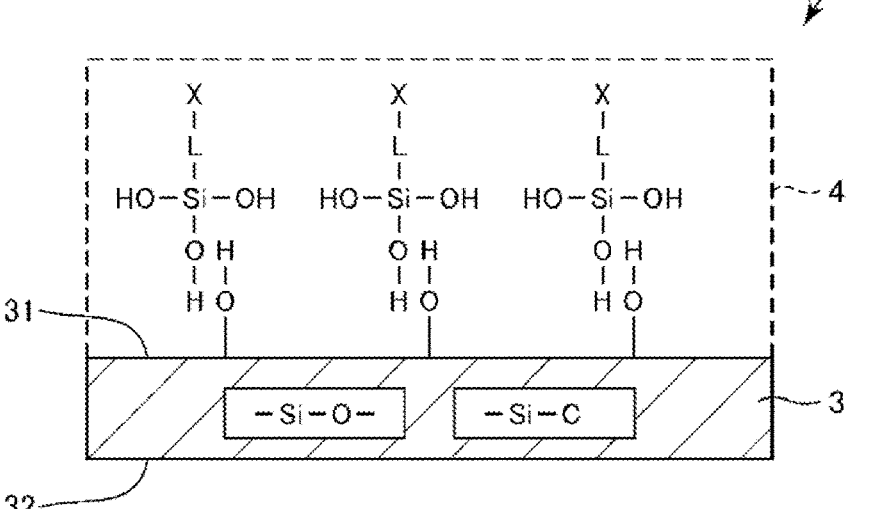
FIG. 2 is a partially enlarged view of FIG. 1.

FIG. 1 is a cross-sectional view schematically illustrating a gas separation membrane 1 according to an embodiment. FIG. 2 is a partially enlarged view of FIG. 1.

The gas separation membrane 1 illustrated in FIG. 1 has the function of selectively allowing the passage of a specific gas component from a mixed gas containing a plurality of gas components. The gas separation membrane 1 illustrated in FIG. 1 includes a resin layer 3 and a modified layer 4.

The resin layer 3 includes an organopolysiloxane. Organopolysiloxanes are polymers including repeating units of —Si—O— in the main chain and including organic groups in side chains. The resin layer 3 includes a first surface 31 (surface on one side) and a second surface 32 (surface on the other side) which are in a front-and-back relationship to each other.

The modified layer 4 is provided at the first surface 31 of the resin layer 3 and includes, as illustrated in FIG. 2, functional groups X introduced into the first surface 31. FIG. 2 is a cross-sectional view schematically illustrating an example of a molecular structure constituting the modified layer 4. The molecular structure illustrated in FIG. 2 is derived from a silane coupling agent.

Note that the posture of the gas separation membrane 1 during use is not limited. In the gas separation membrane 1 illustrated in FIG. 1, a mixed gas is supplied to the upper side of FIG. 1. Accordingly, in the following description, the upper side of the gas separation membrane 1 illustrated in FIG. 1 is referred to as "upstream". In the gas separation membrane 1 illustrated in FIG. 1, a specific gas component passes through the gas separation membrane 1 from the upper side towards the lower side in FIG. 1. Accordingly, in the following description, the lower side of the gas separation membrane 1 illustrated in FIG. 1 is referred to as "downstream".

1.1. Resin Layer

The constituent material of the resin layer 3 is an organopolysiloxane. One molecule of the organopolysiloxane contains at least a unit represented by $R^1SiO_{3/2}$ (T unit), a unit represented by $R^2R^3SiO_{2/2}$ (D unit), and a unit represented by $R^4R^5R^6SiO_{1/2}$ (M unit) as basic constituent units. Note that in each unit, $R^1$ to $R^6$ each represents an aliphatic hydrocarbon or a hydrogen atom. One molecule of the organopolysiloxane contains a combination of the T unit, the D unit, and the M unit.

Specific examples of the organopolysiloxane include polydimethylsiloxane, polymethylphenylsiloxane, polydiphenylsiloxane, polysulfone/polyhydroxystyrene/polydimethylsiloxane copolymer, dimethylsiloxane/methylvinylsiloxane copolymer, dimethylsiloxane/diphenylsiloxane/methylvinylsiloxane copolymer, methyl-3,3,3-trifluoropropylsiloxane/methylvinylsiloxane copolymer, dimethylsiloxane/methylphenylsiloxane/methylvinylsiloxane copolymer, vinyl-terminated diphenylsiloxane/dimethylsiloxane copolymer, vinyl-terminated polydimethylsiloxane, H-terminated polydimethylsiloxane, and dimethylsiloxane-methylhydrosiloxane copolymer. The constituent material of the resin layer 3 may also be one of these examples or a composite of two or more of these examples. It should be noted that these examples include the forms in which a cross-linking reaction product is formed.

Note that organopolysiloxanes have good affinity particularly for carbon dioxide. This affinity contributes to higher selective separation properties with respect to a gas component targeted to be separated. As such, the resin layer 3 exhibits particularly high selective separation properties with respect to carbon dioxide.

Note that the constituent material of the resin layer 3 may contain an optional component at a ratio smaller than that of the organopolysiloxane as long as the function of the resin layer 3 is not impaired.

The average thickness of the resin layer 3, although not limited, may be 100 µm or less, may be from 10 nm to 50 µm, and may be from 30 nm to 30 µm when the resin layer 3 is the base layer of the gas separation membrane 1. This gives the resin layer 3 necessary and sufficient mechanical strength as the base layer of the gas separation membrane 1 while ensuring gas separation properties.

Note that the average thickness of the resin layer 3 can be obtained, for example, by magnifying and observing a cross section of the gas separation membrane 1 and calculating the average value of the thicknesses at ten locations.

The resin layer 3 can be produced by a method of producing a sheet or a film. The resin layer 3 can also be produced by a method of forming a film at a sacrificial layer and then removing the sacrificial layer.

1.2. Modified Layer

The modified layer 4 is formed at the surface upstream of the resin layer 3. As described above, the modified layer 4 includes the functional groups X introduced into the first surface 31. The term "the functional groups X introduced into the first surface 31" means that the functional groups X are bonded to the first surface 31 via molecular chains. That is, the modified layer 4 is a monomolecular layer formed by molecules including the functional groups X reacting with the first surface 31. The resulting modified layer 4 is very thin, and as such the properties derived from the functional groups X can be imparted without gas permeability being impaired. As a result, the resulting gas separation membrane 1 has excellent affinity for a specific gas component and good gas permeability.

The modified layer 4 includes a reaction product between a compound including the functional groups X and the first surface 31. Examples of the compound including the functional groups X include a coupling agent. The coupling agent, which includes hydrolyzable groups and the functional groups X, binds to the first surface 31 to which hydroxyl groups are introduced by activation. In this way, the modified layer 4 derived from the coupling agent is formed.

As illustrated in FIG. 2, the molecular structure of the modified layer 4 is derived from a silane coupling agent as described above. Note that the silane coupling agent illustrated in FIG. 2 is in a state in which the hydrolyzable groups have turned into hydroxyl groups as a result of hydrolysis. In the example of FIG. 2, the hydroxyl groups of the silane coupling agent and the hydroxyl groups introduced into the first surface 31 are attracted to each other by hydrogen bonds. The hydroxyl groups on adjacent molecules of the silane coupling agent are also attracted to each other. As a result, the molecules of the silane coupling agent are distributed along the first surface 31, forming the modified layer 4.

Figure 3:
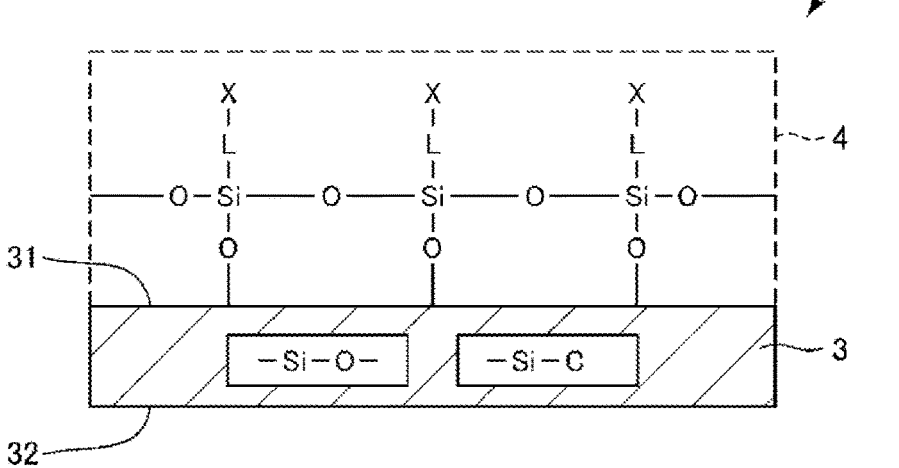
FIG. 3 is a cross-sectional view illustrating a variation of a modified layer illustrated in FIG. 2.

Note that, the bonds between the hydroxyl groups described above may undergo dehydration condensation and become covalent bonds. FIG. 3 is a cross-sectional view illustrating a variation of the modified layer 4 illustrated in FIG. 2. In FIG. 3, the hydroxyl groups of the silane coupling agent and the hydroxyl groups introduced into the first surface 31 undergo dehydration condensation which result in covalent bonds. The bonds between the hydroxyl groups on adjacent molecules of the silane coupling agent also undergo dehydration condensation and become covalent bonds. As a result, a compound derived from the silane coupling agent spreads along the first surface 31, forming the modified layer 4.

Note that, the molecular structure of the modified layer 4 may be a structure including both the structure illustrated in FIG. 2 and the structure illustrated in FIG. 3. That is, hydrogen bonds and covalent bonds may coexist between the compound derived from the silane coupling agent and the first surface 31. Similarly, hydrogen bonds and covalent bonds may coexist between adjacent molecules of the silane coupling agent.

However, in the state illustrated in FIG. 3, siloxane bonds (—Si—O—) are dominant in the molecular structure of the modified layer 4. This may lead to a decrease in the gas permeability of the modified layer 4. As such, the molecular structure of the modified layer 4 may be the structure illustrated in FIG. 2 or the structure including both the structure illustrated in FIG. 2 and the structure illustrated in FIG. 3. This can suppress a decrease in the gas permeability of the modified layer 4.

The average thickness of the modified layer 4 is determined according to the molecular size of a compound including a functional group, and thus is not limited. However, the average thickness of the modified layer 4 may be from 1 nm to 20 nm, and may be from 2 nm to 10 nm. This facilitates the introduction of the functional groups X without increasing the thickness of the gas separation membrane 1.

The functional groups X are selected as appropriate depending on the gas component targeted to be separated. Specifically, the functional groups X are atomic groups having affinity for the gas component targeted to be separated. For example, when the gas component targeted to be separated is carbon dioxide, the functional groups X may be polar groups. Examples of the polar groups include hydroxyl groups, carboxylic acid groups, carboxylate groups, acid anhydride groups, amino groups, amide groups, epoxy groups, mercapto groups, and phenyl groups. Among them, the functional groups X may be amino groups, carboxylic acid groups, or phenyl groups. These groups have good affinity particularly for the n-electrons of carbon dioxide. Therefore, the modified layer 4 including these groups as the functional groups X is imparted with good selective separation properties with respect to carbon dioxide.

In FIG. 2, FIG. 3, and other figures, the linker moiety L is a linking group containing a straight, branched, or cyclic carbon chain. Examples of the linker moiety L include an alkylene group, an ether group (—O—), and an amine (—NR—, where R is a hydrogen atom or an alkyl group including from one to 20 carbon atoms). The alkylene group may include from three to 18 carbon atoms. The alkylene group may further include an optional substituent.

1.3. Analysis by X-ray Photoelectron Spectroscopy (XPS)
1.3.1. Waveform Separation of Si2p Peak The gas separation membrane 1 is subjected to X-ray photoelectron spectrometry (XPS) in which X-rays are irradiated from the front surface side of the modified layer 4, generating an XPS spectrum in a range including an Si2p peak. When subjected to waveform separation, the Si2p peak is separated into an Si—O peak and an Si—C peak.

Figure 4:
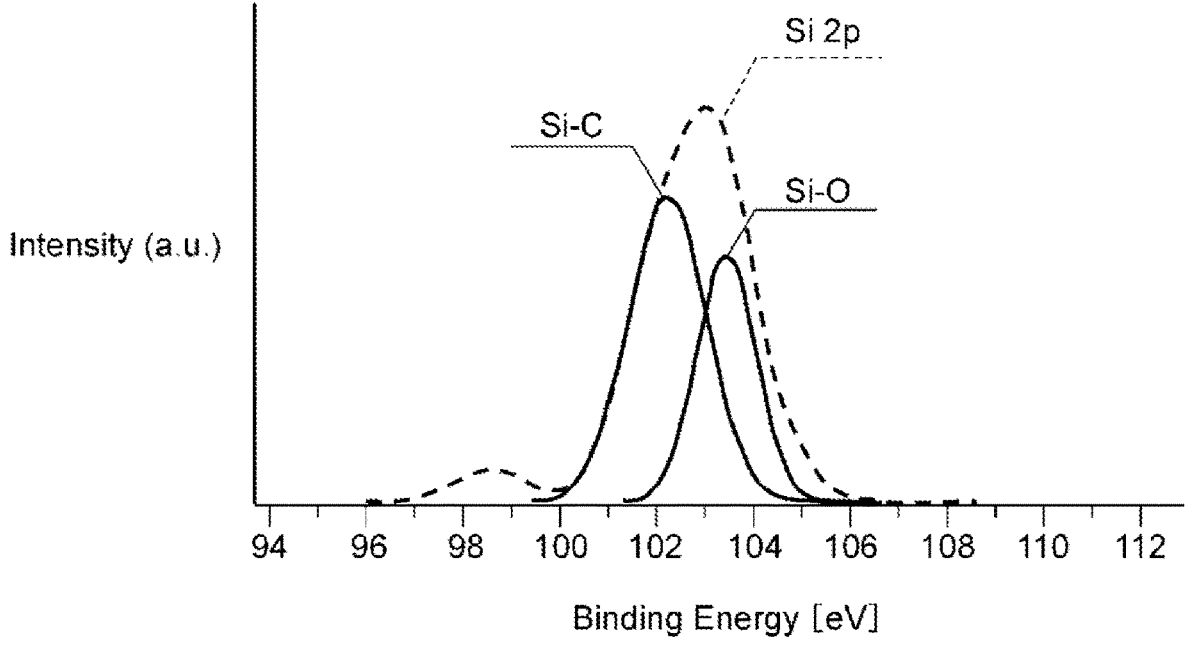
FIG. 4 is a diagram illustrating an XPS spectrum including an Si2p peak obtained for the gas separation membrane, as well as an Si—O peak and an Si—C peak resulted from waveform separation.

FIG. 4 is a diagram illustrating the XPS spectrum including the Si2p peak obtained for the gas separation membrane 1, as well as the Si—O peak and the Si—C peak resulted from waveform separation. As illustrated in FIG. 4, the Si2p peak can be separated into the Si—O peak and the Si—C peak when being subjected to fitting processing that separates a plurality of mutually different chemical bonding states from each other. Such fitting processing can be performed using XPS spectrum analysis software.

In the gas separation membrane 1 according to the present embodiment, the area ratio of the separated Si—O peak to the whole of the Si2p peak is calculated to be from 2% to 30%.

When the analysis result of X-ray photoelectron spectroscopy satisfies the above conditions, the gas separation membrane 1 has good selective separation properties with respect to the target gas and good gas permeability. Specifically, when the area ratio of the Si—O peak is within the above range, the molecular structure of the organopolysiloxane in the base on which the modified layer 4 is formed, that is, in the first surface 31 of the resin layer 3, is appropriately preserved. In other words, when the first surface 31 is subjected to the activation treatment at the time when the functional groups X are introduced, organic groups are eliminated from the organopolysiloxane, and the ratio of bonding sites for introducing the functional groups X, specifically, the ratio of hydroxyl groups or the like, increases. Meanwhile, when the organic groups are excessively eliminated, siloxane bonds (—Si—O—) are generated afterward at the first surface 31 and become excessive. This leads to a decrease in the permeation efficiency of a gas component. In light of such a background, when the area ratio of the Si—O peak is within the above range, excessive generation of siloxane bonds can be suppressed, and the organic groups in the resulting first surface 31 are eliminated at an appropriate level. In other words, the chemical bonding state of the polyorganosiloxane at the first surface 31, which corresponds to the base of the functional groups X, can be optimized. As a result, the functional groups X are introduced at an appropriate density, ensuring the selective separation properties with respect to the target gas while suppressing a decrease in gas permeability due to excessive siloxane bonds.

Note that, in XPS, the escape depth of photoelectrons is 10 nm or less. As described above, the modified layer 4 is a monomolecular layer. As such, when X-rays are irradiated from the front surface side of the modified layer 4, information in the vicinity of the first surface 31 is acquired by the detector of a XPS device.

The area ratio of the separated Si—O peak to the whole of the Si2p peak may be from 5% to 25%, and may be from 10% to 20%.

When the area ratio of the Si—O peak is below the lower limit, it means that the density of the Si—O bonds is insufficient, that is, the activation treatment is not sufficient. Therefore, the functional groups X cannot be introduced to the first surface 31 at a sufficient density. This leads to decreased selective separation properties with respect to the target gas at the gas separation membrane 1. Meanwhile, when the area ratio of the Si—O peak exceeds the upper limit, it means that the density of the Si—O bonds is excessive, that is, excessive activation treatment is applied. As a result, siloxane bonds become dominant in the vicinity of the first surface 31, which gives the gas separation membrane 1 a decreased gas permeability.

Note that the highest point of the Si2p peak is located in a range of from 101 eV to 104 eV. The highest point of the Si—O peak is located in a range of from 103 eV to 104 eV. The highest point of the Si—C peak is located in a range of from 101 eV to 103 eV.

1.3.2. Qualitative and Quantitative Analysis by XPS

The gas separation membrane 1 is subjected to X-ray photoelectron spectrometry (XPS) in which X-rays are irradiated from the front surface side of the modified layer 4, generating an XPS spectrum in a range (a wide-scan) including the Si2p peak, a C1s peak and a O1s peak. Then, the front surface of the modified layer 4 is subjected to a qualitative and quantitative analysis (elemental analysis) based on the area ratios of the obtained Si2p peak, C1s peak, and O1s peak. Note that, the area ratio of each peak corresponds to the content of each element.

The result of the qualitative and quantitative analysis indicates that in the gas separation membrane 1, the area ratio of the Si2p peak to the whole of the XPS spectrum may be 5% or greater, may be from 7% to 30%, and may be from 7% to 20%. The "whole of the XPS spectrum" herein refers to the sum of the areas of the Si2p peak, the C1s peak, and the O1s peak. When the area ratio of the Si2p peak is within the above range, the modified layer 4 can be regarded as a monomolecular layer. Specifically, the modified layer 4 is formed by the compound, which includes the functional groups X, binding to the first surface 31. In this case, when the modified layer 4 is a monomolecular layer, the thickness of the modified layer 4 is smaller than the escape depth of photoelectrons, and thus the composition of the first surface 31 serving as the base is reflected in the result of the qualitative and quantitative analysis regardless of the composition of the modified layer 4. That is, even when X-rays are irradiated from the front surface side of the modified layer 4, the composition of the first surface 31 can be seen through the modified layer 4. As such, when the area ratio of the Si2p peak is within the above range, the modified layer 4 is considered to be sufficiently thin. Therefore, when the area ratio of the Si2p peak is within the above range, the resulting gas separation membrane 1 has particularly high gas permeability.

Note that, when the area ratio of the Si2p peak is less than the lower limit, the modified layer 4 can be considered to be thicker than a monomolecular layer. This may lead to a decrease in the gas permeability of the gas separation membrane 1. Meanwhile, when the area ratio of the Si2p peak exceeds the upper limit, the modified layer 4 may be too thin. Specifically, the functional groups X may not be successfully introduced, or the density of the functional groups X introduced may be low.

Note that the area of each peak can be determined using XPS spectrum analysis software. Further, the modified layer 4 does not have to be a monomolecular layer. That is, the modified layer 4 may be a multimolecular layer.

In addition to the above description of the gas separation membrane 1 according to an embodiment, an optional layer may be provided at either downstream of the resin layer 3, or upstream of the modified layer 4, or both.

2. Variation

Next, a configuration of a gas separation membrane according to a variation will be described.

Figure 5:
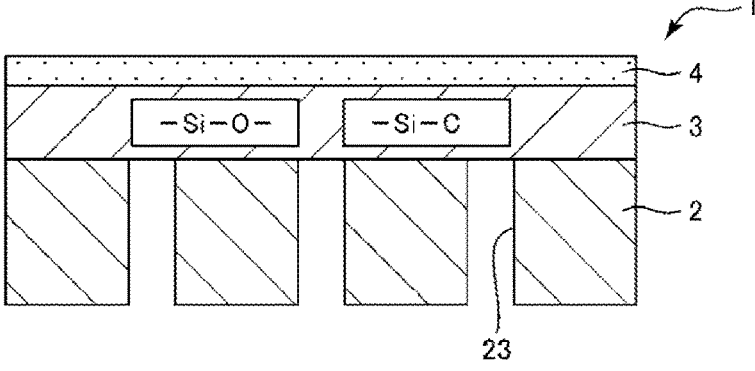
FIG. 5 is a cross-sectional view schematically illustrating a gas separation membrane according to a variation.

FIG. 5 is a cross-sectional view schematically illustrating a gas separation membrane 1 according to the variation.

The variation will be described below. However, the following description will mainly focus on the differences between the variation and the embodiment above, and descriptions of similar items will be omitted. Note that in FIG. 5, the same components as those of the embodiment above are denoted by the same reference numerals.

The variation is the same as the embodiment above except that a porous layer 2 is added. That is, the gas separation membrane 1 illustrated in FIG. 5 is a composite membrane in which the porous layer 2, the resin layer 3, and the modified layer 4 are stacked in this order. The porous layer 2 has a rigidity higher than that of the resin layer 3 or the modified layer 4. As such, by providing the porous layer 2, the shape retention of the gas separation membrane 1 can be improved.

The porous layer 2 is a porous substance including pores 23. This allows the porous layer 2 to have good gas permeability. Examples of the constituent material of the porous layer 2 include a polymer material, a ceramic material, and a metal material. The constituent material of the porous layer 2 may also be a composite material of any of the aforementioned materials and another material.

Examples of the polymer material include: polyolefin resins, such as polyethylene and polypropylene; fluororesins, such as polytetrafluoroethylene, polyvinyl fluoride, and polyvinylidene fluoride; polystyrene; cellulose acetate; polyurethane; polyacrylonitrile; polyphenylene oxide; polysulfone; polyethersulfone; polyimide; and polyaramid.

Examples of the ceramic material include alumina, cordierite, mullite, silicon carbide, and zirconia. Examples of the metal material include stainless steel. The constituent material of the porous layer 2 may also be a composite material containing two or more of the aforementioned materials.

Among these examples, the constituent material of the porous layer 2 may be a ceramic material. Since ceramic materials are sintered materials, they contain individual or continuous pores. Therefore, by using a ceramic material as the constituent material of the porous layer 2, the adhesion between the porous layer 2 and the resin layer 3 can be further improved.

In addition to the flat-sheet shape illustrated in FIG. 5, the shape of the porous layer 2 may be a spiral shape, a tubular shape, a hollow-fiber shape, or the like.

The average thickness of the porous layer 2, although not limited, may be from 1 μm to 3000 μm, may be from 5 μm to 500 μm, and may be from 10 μm to 150 μm. This gives the porous layer 2 necessary and sufficient rigidity to support the resin layer 3 and the modified layer 4.

Note that the average thickness of the porous layer 2 is an average value of thicknesses in the stacking direction measured at ten locations of the porous layer 2. The thickness measurement of the porous layer 2 can be carried out by using, for example, a thickness gauge.

The porous layer 2 includes the pores 23, and the average diameter of the pores 23 is referred to as the "average pore diameter". The average pore diameter of the porous layer 2 may be 0.1 μm or less, may be from 0.01 μm to 0.09 μm, and may be from 0.01 μm to 0.07 μm. In this way, the resin layer 3 is less likely to run over downstream of the porous layer 2.

Note that the average pore diameter of the porous layer 2 is measured by a through-pore diameter evaluation device. Examples of the through-pore diameter evaluation device include Perm-Porometer available from Porous Materials Inc.

The porosity of the porous layer 2 may be from 20% to 90%, and may be from 30% to 80%. This allows the porous layer 2 to have both good gas permeability and sufficient rigidity.

Note that the porosity of the porous layer 2 is measured by the above-described through-pore diameter evaluation device.

In addition to the above description of the gas separation membrane 1 according to the variation, an optional layer may be provided in at least one of the following three locations: downstream of the porous layer 2, between the porous layer 2 and the resin layer 3, or upstream of the modified layer 4.

3. Method of Producing Gas Separation Membrane

Next, a method of producing the gas separation membrane according to an embodiment will be described.

Figure 6:
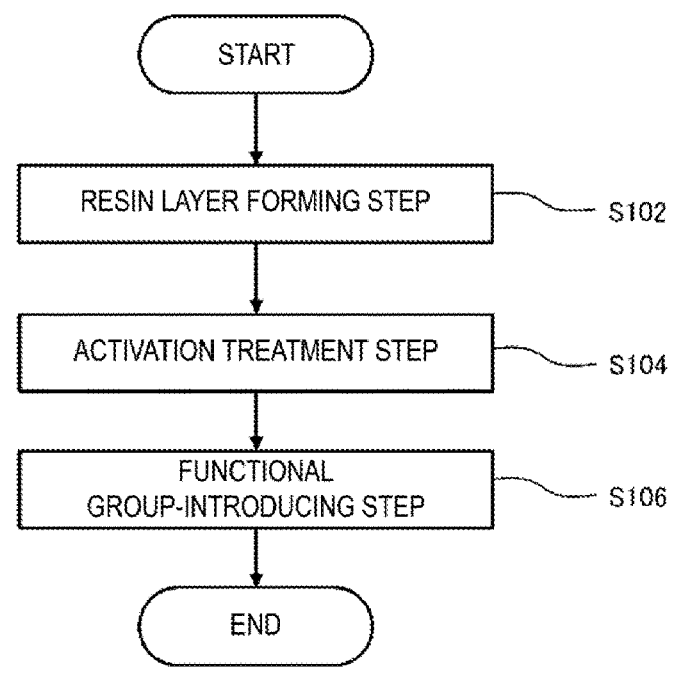
FIG. 6 is a flowchart for explaining a method of producing the gas separation membrane according to an embodiment.
Figure 7:
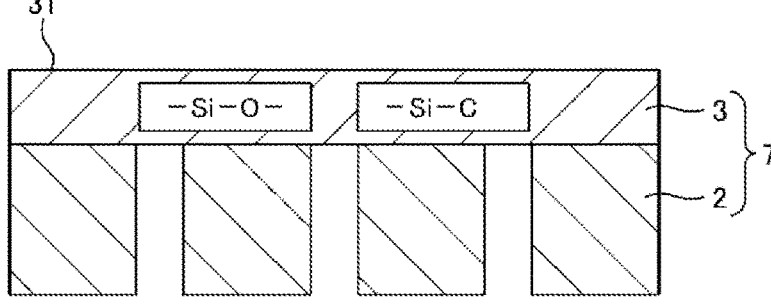
FIG. 7 is a cross-sectional view for schematically explaining the method of producing the gas separation membrane illustrated in FIG. 6.
Figure 8:
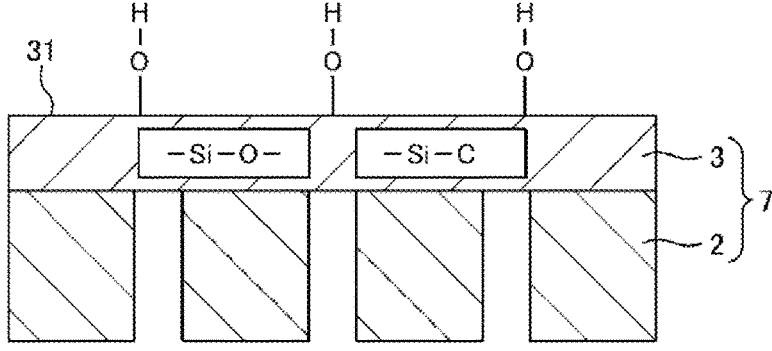
FIG. 8 is a cross-sectional view for schematically explaining the method of producing the gas separation membrane illustrated in FIG. 6.
Figure 9:
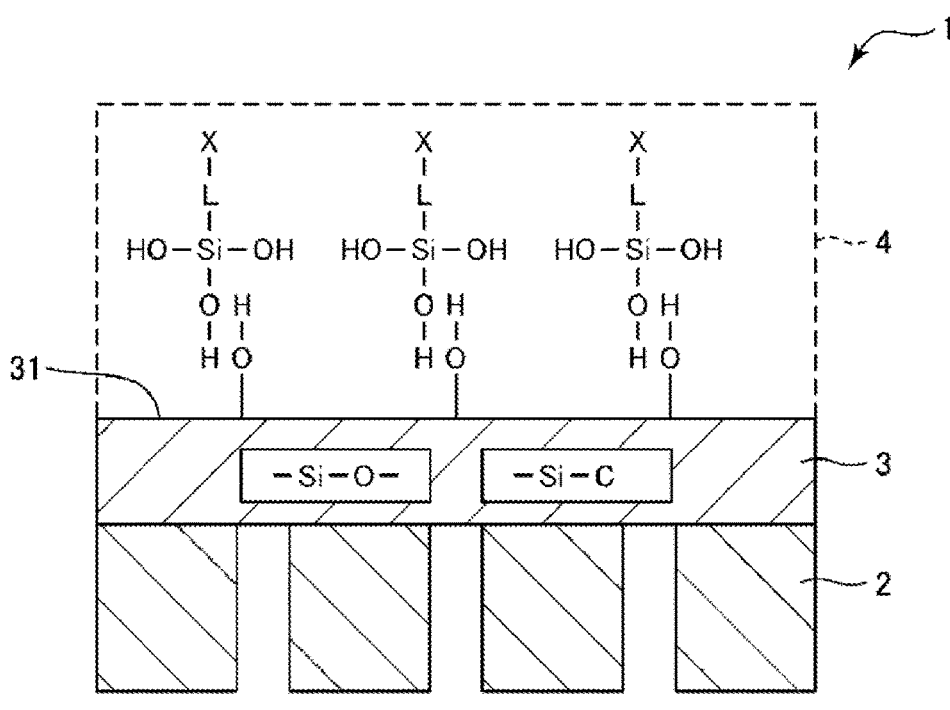
FIG. 9 is a cross-sectional view for schematically explaining the method of producing the gas separation membrane illustrated in FIG. 6.

FIG. 6 is a flowchart for explaining the method of producing the gas separation membrane according to an embodiment. FIG. 7 to FIG. 9 are cross-sectional views for schematically explaining the method of producing the gas separation membrane illustrated in FIG. 6. Note that in the following description, a method of producing the gas separation membrane 1 illustrated in FIG. 5 will be described as an example.

The method of producing the gas separation membrane 1 illustrated in FIG. 5 includes a resin layer forming step S102, an activation treatment step S104, and a functional group-introducing step S106. Each step will be described below in sequence.

3.1. Resin Layer Forming Step

In the resin layer forming step S102, as illustrated in FIG. 7, the resin layer 3 is formed at a surface on one side of the porous layer 2.

The resin layer 3 includes an organopolysiloxane and is formed at the surface on one side of the porous layer 2. Examples of the method of forming the resin layer 3 include a method of attaching a sheet or a film to produce the resin layer 3, and a method of forming a film from a raw material using various film forming methods to produce the resin layer 3.

Examples of the method of forming a film of the organopolysiloxane include a liquid-phase deposition method such as the sol-gel method and a coating method, as well as a gas-phase deposition method a plasma CVD method and a plasma polymerization method.

In this way, a laminate 7 of the porous layer 2 and the resin layer 3 illustrated in FIG. 7 is produced.

3.2. Activation Treatment Step

In the activation treatment step S104, the first surface 31 of the resin layer 3 is subjected to an activation treatment. The activation treatment is not limited as long as it is a treatment that activates the first surface 31. Examples of the activation treatment include a method of irradiating the resin layer 3 with energy rays, a method of heating the resin layer 3, a method of exposing the resin layer 3 to plasma or corona, and a method of exposing the resin layer 3 to ozone gas. Examples of the energy rays include infrared rays, ultraviolet rays, and visible light. When the activation treatment is performed, a part of the organic groups of the organopolysiloxane constituting the resin layer 3 is eliminated. After the elimination of the organic groups, H atoms or moisture are adsorbed to the dangling bonds, generating active species at the first surface 31. Examples of the active species include Si—H groups, as well as the Si—OH groups illustrated in FIG. 8. In addition, the activation treatment cleans the first surface 31 and facilitates the generation of active species.

Note that the activation treatment may be a plasma treatment. In the plasma treatment, the first surface 31 of the resin layer 3 can be evenly treated by the activation treatment. Examples of the treatment gas used in the plasma treatment include water vapor, oxygen, argon, and nitrogen. Note that the treatment gas may be a mixed gas of two or more types of gases. This can increase the degree of activation even when the treatment time is short.

3.3. Functional Group-Introducing Step

The functional group-introducing step S106 is provided after the activation treatment step S104. In the functional group-introducing step S106, a coupling agent is brought into contact with the first surface 31 (surface on one side) subjected to the activation treatment. In this way, functional groups are introduced into the first surface 31.

The coupling agent is a compound including functional groups and a hydrolyzable group.

Examples of the functional groups include hydroxyl groups, carboxylic acid groups, carboxylate groups, acid anhydride groups, amino groups, amide groups, epoxy groups, mercapto groups, and phenyl groups.

Examples of the hydrolyzable group include an alkoxy group, an acyloxy group, an aryloxy group, an aminoxy group, an amide group, a ketoxime group, an isocyanate group, a halogen atom, and a carboxylic acid group. The hydrolyzable group may also be a hydrolyzate of these groups. For example, an alkoxy group becomes an alcoholic hydroxyl group upon hydrolysis. Among these hydrolyzable groups, the hydrolyzable group may be an alkoxy group or a carboxylic acid group. These groups efficiently bind to the first surface 31 subjected to the activation treatment.

Examples of the coupling agent include a silane coupling agent, a titanium coupling agent, an aluminum coupling agent, and a zirconium coupling agent, of which the coupling agent may be a silane coupling agent.

The coupling agent may be a compound including three hydrolyzable groups per molecule, but may be a compound including one or two hydrolyzable groups per molecule. When the coupling agent including such a compound is supplied to the first surface 31, the rate at which covalent bonds occur between adjacent molecules is reduced. That is, excessive siloxane bonds in the molecular structure of the modified layer 4 can be suppressed. In other words, the structure illustrated in FIG. 2 or the structure including both the structure illustrated in FIG. 2 and the structure illustrated in FIG. 3 can be formed. This can suppress decrease in gas permeability of the modified layer 4.

The resin layer 3 brought into contact with the coupling agent may be subjected to a heat treatment when necessary. The conditions of the heat treatment are, for example, a temperature of from 60° C. to 120° C. and a time of from 10 minutes to 300 minutes. This can promote dehydration condensation, which can in turn remove a hydrate that is derived from the coupling agent and that remains in the modified layer 4, or can improve the adhesion of the modified layer 4.

By introducing the functional groups as described above, the modified layer 4 illustrated in FIG. 9 is formed, resulting in the gas separation membrane 1.

3.4. Analysis by X-ray Photoelectron Spectroscopy (XPS)

In the gas separation membrane 1 produced as described above, the first surface 31 with the functional groups introduced is subjected to X-ray photoelectron spectrometry (XPS), generating an XPS spectrum in a range including an Si2p peak. This is the same as the above-described X-ray photoelectron spectroscopy in which X-rays are irradiated from the front surface side of the modified layer 4. As such, when subjected to waveform separation, the Si2p peak of the resulting XPS spectrum is separated into an Si—O peak and an Si—C peak.

In the first surface 31 with the functional groups introduced, the area ratio of the separated Si—O peak to the whole of the Si2p peak is calculated to be from 2% to 30%.

When the analysis result of X-ray photoelectron spectroscopy satisfies the above conditions, the gas separation membrane 1 has good selective separation properties with respect to the target gas and good gas permeability. Specifically, when the area ratio of the Si—O peak is within the above range, the molecular structure of the organopolysiloxane in the base on which the modified layer 4 is formed, that is, in the first surface 31 of the resin layer 3, is appropriately preserved. That is, when the area ratio of the Si—O peak is within the above range, excessive generation of siloxane bonds can be suppressed, and the organic groups in the resulting first surface 31 are eliminated at an appropriate level. As a result, the functional groups are introduced at an appropriate density, ensuring the selective separation properties with respect to the target gas while suppressing decrease in gas permeability due to excessive siloxane bonds.

The area ratio of the separated Si—O peak to the whole of the Si2p peak may be from 5% to 25%, and may be from 10% to 20%.

4. Use of Gas Separation Membrane

The gas separation membrane 1 according to an embodiment can be used for gas separation and recovery, gas separation and purification, and the like. For example, the gas separation membrane 1 is used to efficiently separate a specific gas component from a mixed gas containing gas components such as hydrogen, helium, carbon monoxide, carbon dioxide, hydrogen sulfide, oxygen, nitrogen, ammonia, sulfur oxides, nitrogen oxides, as well as saturated hydrocarbons such as methane, ethane, unsaturated hydrocarbons such as propylene, and perfluorohydrocarbons such as tetrafluoroethane. In particular, the gas separation membrane 1 may be used for the purpose of selectively allowing the passage of carbon dioxide from a mixed gas containing carbon dioxide and other gas components. Thus, the gas separation membrane 1 can be applied to, for example, a technique for separating and recovering carbon dioxide contained in the atmosphere (direct air capture, or DAC) and a technique for separating and recovering carbon dioxide from a crude oil-associated gas or a natural gas containing methane as the main component.

5. Effects Achieved by Embodiment and Variation Described Above

As described above, the gas separation membranes 1 according to the embodiment and the variation described above include the resin layer 3 and the modified layer 4. The resin layer 3 includes an organopolysiloxane. The modified layer 4 is provided at the first surface 31 (surface on one side) of the resin layer 3 and includes functional groups introduced into the first surface 31.

When X-ray photoelectron spectrometry, in which X-rays are irradiated from the front surface side of the modified layer 4, is performed to generate an XPS spectrum in a range including an Si2p peak and the Si2p peak is subjected to waveform separation, the area ratio of the Si—O peak to the Si2p peak in the gas separation membrane 1 is from 2% to 30%.

According to such a configuration, excessive generation of siloxane bonds can be suppressed, and the organic groups in the resulting first surface 31 are eliminated at an appropriate level. That is, the chemical bonding state of the polyorganosiloxane can be optimized at the base for introducing the functional groups. As such, the resulting gas separation membrane 1 includes functional groups introduced at an appropriate density and can suppress decrease in gas permeability due to excessive siloxane bonds while guaranteeing the selective separation properties with respect to the target gas. That is, the gas separation membrane 1 having both good selective separation properties and good gas permeability can be produced.

When the XPS spectrum is in a range including the Si2p peak, a C1s peak, and a O1s peak, elemental analysis is performed based on this XPS spectrum. In the result of such an elemental analysis, the area ratio of the Si2p peak to the whole of the XPS spectrum may be 5% or greater.

In this case, the modified layer 4 can be regarded as a monomolecular layer. That is, when the area ratio of the Si2p peak is within the above range, the modified layer 4 is considered to be sufficiently thin. Therefore, when the area ratio of the Si2p peak is within the above range, the resulting gas separation membrane 1 has particularly high gas permeability.

Further, the functional groups X introduced into the first surface 31 may be amino groups, carboxylic acid groups, or phenyl groups. These groups have good affinity particularly for the n-electrons of carbon dioxide. Therefore, the modified layer 4 including these groups as the functional groups X is imparted with good selective separation properties with respect to carbon dioxide.

The method of producing the gas separation membrane 1 according to the embodiment includes the activation treatment step S104 and the functional group-introducing step S106. In the activation treatment step S104, the first surface 31 (surface on one side) of the resin layer 3 including an organopolysiloxane is subjected to an activation treatment. The functional group-introducing step S106 is provided after the activation treatment step S104. In the functional group-introducing step S106, a coupling agent is brought into contact with the first surface 31 subjected to the activation treatment, thereby introducing the functional groups into the first surface 31.

When the first surface 31 with the functional groups introduced is subjected to X-ray photoelectron spectrometry to generate an XPS spectrum including an Si2p peak and the Si2p peak is subjected to waveform separation, the area ratio of an Si—O peak derived from $SiO_2$ to the Si2p peak in the resulting gas separation membrane 1 is from 2% to 30%.

According to such a production method, the gas separation membrane 1 having both good selective separation properties and good gas permeability can be produced.

In addition, the coupling agent described above may include one or two hydrolyzable groups per molecule. Further, the hydrolyzable group may be an alkoxy group or a carboxylic acid group. These hydrolyzable groups efficiently bind to the first surface 31 subjected to the activation treatment.

Although the gas separation membrane and the method of producing a gas separation membrane according to an aspect of the present disclosure have been described above based on a preferred embodiment, the present disclosure is not limited thereto.

For example, in the gas separation membrane according to an aspect of the present disclosure, each part of the embodiment described above may be replaced with a component having a similar function, and any component may be added to the embodiment described above. In addition, the method of producing the gas separation membrane according to an aspect of the present disclosure may be the embodiment described above plus an additional step having a purpose.

EXAMPLES

Next, specific examples of the present disclosure will be described.

6. Preparation of Gas Separation Membrane

6.1. Example 1

First, a PDMS sheet serving as a resin layer is prepared. The PDMS sheet is a 30 μm-thick sheet made of polydimethylsiloxane.

Next, a surface on one side of the PDMS sheet was subjected to a plasma treatment, which was an activation treatment. Subsequently, a coupling agent was supplied to the surface subjected to the activation treatment to introduce functional groups. As a result, a modified layer was formed, resulting in a gas separation membrane.

6.2. Examples 2 to 6

Gas separation membranes were produced in the same manner as in Example 1 except that the conditions of the plasma treatment and other conditions were changed to those presented in Table 1.

6.3. Comparative Example 1

A gas separation membrane was produced in the same manner as in Example 1 except that the plasma treatment was omitted.

6.4. Comparative Examples 2 and 3

Gas separation membranes were produced in the same manner as in Example 1 except that the conditions of the plasma treatment were changed to those presented in Table 1.

The compound names of the coupling agents used in each Example and each Comparative Example are as follows. Table 1 includes the following symbols which correspond to the compound names.

S-1: Diphenyldimethoxysilane
S-2: Phenyltrimethoxysilane
S-3: p-Phthalic acid
S-4: N-2-(aminoethyl)-3-aminopropylmethyldimethoxysilane

7. Analysis of Gas Separation Membrane

The gas separation membranes of Examples and Comparative Examples were analyzed as follows.

Figure 10:
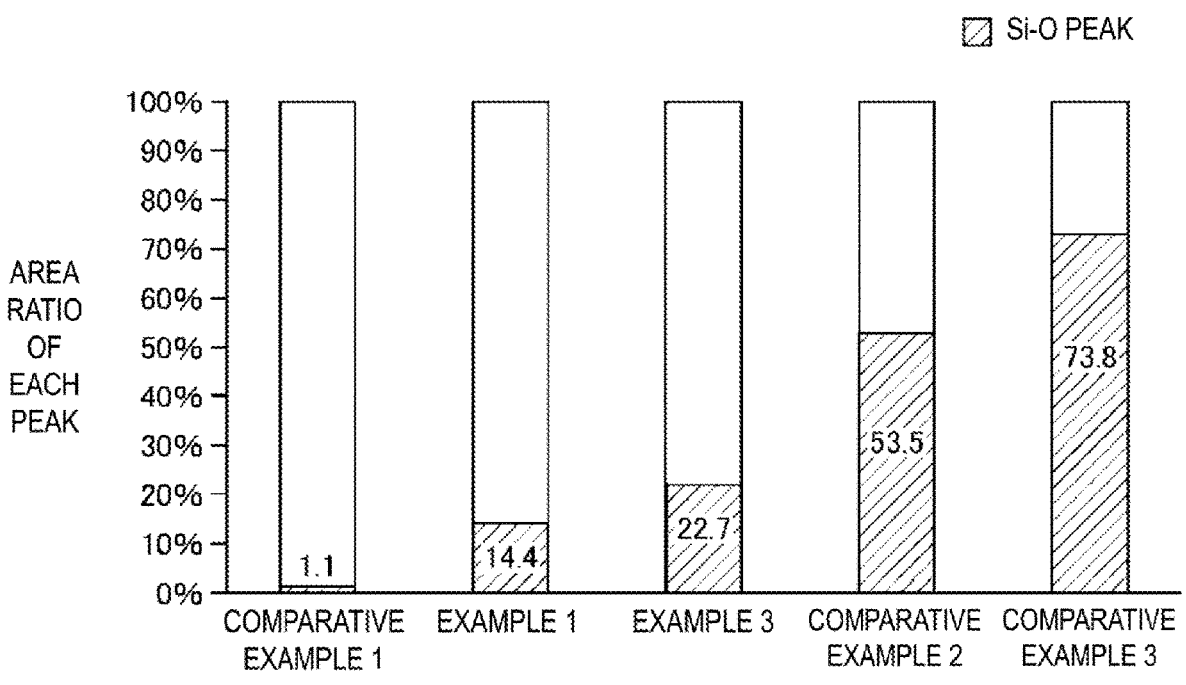
FIG. 10 is a graph comparing the area ratios of Si—O peaks and Si—C peaks in XPS spectra obtained for the gas separation membranes of Examples 1 and 3 and Comparative Examples 1 to 3.

X-rays were irradiated from the front surface side of the modified layer of the gas separation membrane to generate an XPS spectrum. Next, the Si2p peak was subjected to waveform separation. As a result, the Si2p peak was able to be separated into an Si—O peak and an Si—C peak. Then, the area ratio of the obtained Si—O peak to the Si2p peak was calculated. Note that, the remainder of the area ratio was regarded as the area ratio of the Si—C peak. The calculation results are summarized in FIG. 10. FIG. 10 is a graph comparing the area ratios of the Si—O peaks and the Si—C peaks in XPS spectra obtained for the gas separation membranes of Examples 1 and 3 and Comparative Examples 1 to 3.

In the gas separation membranes of Examples, the area ratios of the Si—O peaks were within a range of from 2% to 30%. Meanwhile, in the gas separation membranes of Comparative Examples, the area ratios of the Si—O peaks were out of this range.

In addition, wide-scan XPS spectra were obtained. Then, the area ratios of the Si2p peaks to the wholes of the XPS spectra were calculated. The results indicated that the area ratios of the Si2p peaks obtained from the gas separation membranes of Examples were all 5% or greater. This confirmed that the modified layers of the gas separation membranes of Examples were all monomolecular layers.

8. Evaluation of Gas Separation Membrane

The gas separation membranes of Examples and Comparative Example were evaluated as follows.

8.1. Gas Permeability

The gas separation membranes of Examples and Comparative Example were cut into circles having a diameter of 5 cm, resulting in test samples. Next, a mixed gas in which carbon dioxide and nitrogen were mixed at a volume ratio of 13:87 was supplied upstream of the test samples using a gas transmission rate measuring device. Note that, the total pressure upstream was adjusted to 5 MPa, the partial pressure of carbon dioxide was adjusted to 0.65 MPa, the flow rate was adjusted to 500 mL/min, and the temperature was adjusted to 40° C. Then, gas components passed through the test samples were analyzed by gas chromatography.

Next, based on the analytical results, carbon dioxide gas permeation rates $R_{CO2}$ at the gas separation membranes were calculated. Subsequently, "$CO_2$ permeability decrease rate" was calculated. "$CO_2$ permeability decrease rate" measures the level of decrease in the gas permeation rate $R_{CO2}$ calculated for the gas separation membrane of each Examples and each Comparative Examples when compared to the reference which is the gas permeation rate $R_{CO2}$ calculated for the gas separation membrane of Comparative Example 1. In the gas separation membrane of Comparative Example 1, the plasma treatment (activation treatment) was omitted. As such, the $CO_2$ permeability decrease rate serves as an indicator for quantitatively evaluating the decrease of $CO_2$ permeability due to plasma treatment. Note that, the $CO_2$ permeability decrease rate is a ratio of a decrease relative to the reference described above. Then, relative evaluation of the gas permeabilities of the gas separation membranes were performed by comparing the calculated $CO_2$ permeability decrease rates with the following evaluation criteria.

A: The $CO_2$ permeability decrease rate is 20% or less
B: The $CO_2$ permeability decrease rate is more than 20% and 30% or less
C: The $CO_2$ permeability decrease rate is more than 30%

Figure 11:
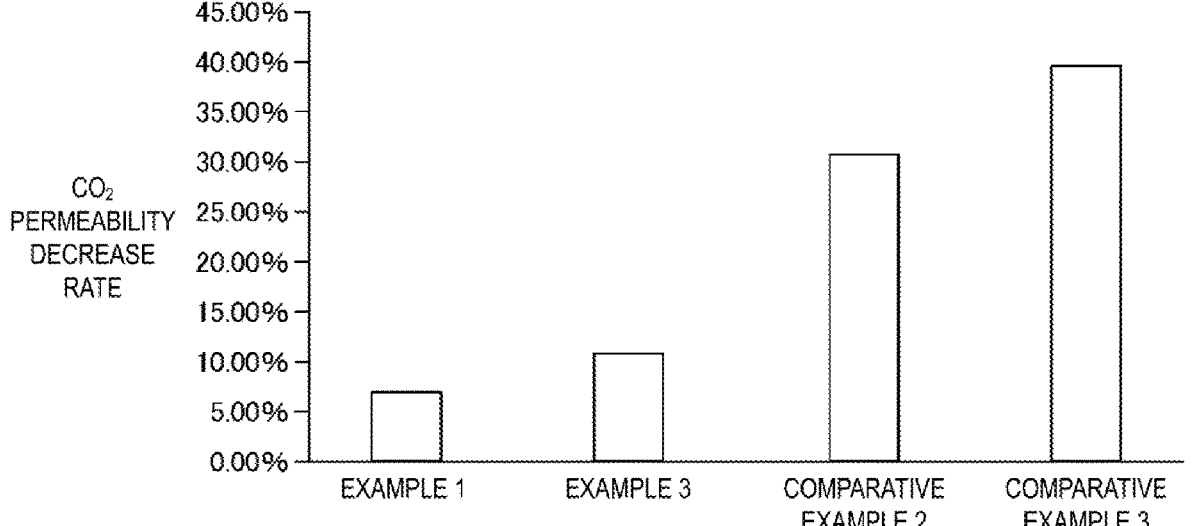
FIG. 11 is a graph comparing $CO_2$ permeability decrease rates calculated from results of gas permeability tests performed on the gas separation membranes of Examples 1 and 3 and Comparative Examples 2 and 3.

The evaluation results are presented in Table 1. In addition, the calculated $CO_2$ permeability decrease rates are summarized in FIG. 11. FIG. 11 is a graph comparing $CO_2$ permeability decrease rates calculated from the results of gas permeability tests performed on the gas separation membranes of Examples 1 and 3 and Comparative Examples 2 and 3.

8.2. Selective Separation Properties

Based on the analytical results above, nitrogen gas permeation rates $R_{N2}$ at the gas separation membranes were calculated. Then, the ratios of the carbon dioxide gas permeation rate $R_{CO2}$ to the nitrogen gas permeation rate $R_{N2}$, or $R_{CO2}/R_{N2}$, were calculated. Then, relative evaluation of the selective separation properties of the gas separation membranes was performed by comparing the ratio $R_{CO2}/R_{N2}$ with the following evaluation criteria.

A: The ratio $R_{CO2}/R_{N2}$ is greater than that in Comparative Example 1

B: The ratio $R_{CO2}/R_{N2}$ is equivalent to that in Comparative Example 1

C: The ratio $R_{CO2}/R_{N2}$ is less than that in Comparative Example 1

The evaluation results are presented in Table 1.

modified layer, an XPS spectrum in a range including an Si2p peak is generated, the Si2p peak is subjected to a fitting process to separate an Si—O peak from the Si2p peak, and a ratio of an area of the Si—O peak in the XPS spectrum to an area of the Si2p peak in the XPS spectrum is from 2% to 30%.

2. The gas separation membrane according to claim 1, wherein the XPS spectrum is a spectrum in a range including the Si2p peak, a C1s peak, and a O1s peak, and an area ratio of the Si2p peak to a whole of the XPS spectrum is 5% or greater when elemental analysis is performed based on the XPS spectrum.

3. The gas separation membrane according to claim 1, wherein

TABLE 1

| Category | Subcategory | Property | Unit | Comparative example 1 | Example 1 | Example 2 | Example 3 | Example 4 | Example 5 | Example 6 | Comparative example 2 | Comparative example 3 |
|---|---|---|---|---|---|---|---|---|---|---|---|---|
| Composition of gas separation membrane | Plasma treatment | Processing time | Seconds | 0 | 10 | 20 | 30 | 10 | 10 | 10 | 10 | 60 |
| | | Treatment gas | — | — | — | Single gas | Single gas | Single gas | Single gas | Single gas | Mixed gas | Single gas |
| | Coupling agent | Compound | | S-1 | S-1 | S-1 | S-1 | S-2 | S-3 | S-4 | S-1 | S-1 |
| | | Functional group | — | Phenyl group | Phenyl group | Phenyl group | Phenyl group | Phenyl group | Carboxylic acid group | Amino group | Phenyl group | Phenyl group |
| | | Number of hydrolyzable groups | — | 2 | 2 | 2 | 2 | 3 | 1 | 2 | 2 | 2 |
| | XPS analysis results | Area ratio of Si—O peak to Si2p peak | % | 1.1 | 14.4 | 18.2 | 22.7 | 15.1 | 5.5 | 10.6 | 53.5 | 73.8 |
| | | Area ratio of Si2p peak to whole | % | 60 | 9 | 10 | 11 | 25 | 8 | 9 | 11 | 11 |
| Evaluation result of gas separation membrane | | Gas permeability | | — | A | A | A | B | A | A | C | C |
| | | Selective separation properties | | — | A | A | A | A | A | A | A | A |

As indicated by Table 1, the gas separation membrane of each Example had both good gas permeability and good selective separation properties. Meanwhile, the gas separation membrane of Comparative Example 1 had selective separation properties lower than the selective separation properties of the gas separation membranes of Examples. The reason is considered to be that functional groups were not sufficiently introduced because activation treatment was not performed during the production of the gas separation membrane. Further, the gas separation membranes of Comparative Examples 2 and 3 did not have sufficient gas permeability. The reason is considered to be that excessive activation treatment was applied during the production of the gas separation membranes, and thus siloxane bonds become dominant in the resin layers, which lead to decreased gas permeabilities.

What is claimed is:

1. A gas separation membrane comprising:

a resin layer including an organopolysiloxane; and a modified layer provided at a surface on one side of the resin layer and including a polar group introduced into the surface on the one side, wherein in an X-ray photoelectron spectrometry process, when X-rays are irradiated from a front surface side of the the polar group includes an amino group, a carboxylic acid group, or a phenyl group.

4. A method of producing a gas separation membrane, the method comprising:

an activation treatment step of subjecting a surface on one side of a resin layer to an activation treatment, the resin layer including an organopolysiloxane; and a polar group-introducing step of bringing a coupling agent into contact with a surface on the one side subjected to the activation treatment to introduce a polar group into the surface on the one side, the polar group-introducing step being provided after the activation treatment step, wherein in an X-ray photoelectron spectrometry process, when X-rays are irradiated from the surface on the one side with the polar group introduced, an XPS spectrum in a range including an Si2p peak is generated, the Si2p peak is subjected to a fitting process to separate an Si—O peak from the Si2p peak, and a ratio of an area of the Si—O peak in the XPS spectrum to an area of the Si2p peak in the XPS spectrum is from 2% to 30%.

5. The method of producing the gas separation membrane according to claim 4, wherein the coupling agent includes one or two hydrolyzable groups per molecule, and the hydrolyzable group is an alkoxy group or a carboxylic acid group.

* * * * *